United States Patent
Song et al.

(10) Patent No.: US 10,158,119 B2
(45) Date of Patent: *Dec. 18, 2018

(54) ELECTROLYTIC COPPER FOIL, AND COLLECTOR, NEGATIVE ELECTRODE, AND LITHIUM BATTERY COMPRISING SAME

(71) Applicant: ILJIN MATERIALS CO., LTD., Iksan-si, Jeollabuk-do (KR)

(72) Inventors: Ki Deok Song, Suwon-si (KR); Sun Hyoung Lee, Iksan-si (KR); Tae Jin Jo, Seongnam-si (KR); Seul Ki Park, Jindo-gun (KR)

(73) Assignee: ILJIN MATERIALS CO., LTD., Iksan-Si (KR)

( * ) Notice: Subject to any disclaimer, the term of this patent is extended or adjusted under 35 U.S.C. 154(b) by 44 days.

This patent is subject to a terminal disclaimer.

(21) Appl. No.: 15/127,651

(22) PCT Filed: Mar. 20, 2015

(86) PCT No.: PCT/KR2015/002726
§ 371 (c)(1),
(2) Date: Sep. 20, 2016

(87) PCT Pub. No.: WO2015/142101
PCT Pub. Date: Sep. 24, 2015

(65) Prior Publication Data
US 2017/0141404 A1    May 18, 2017

(30) Foreign Application Priority Data
Mar. 20, 2014 (KR) .......... 10-2014-0032933

(51) Int. Cl.
| | | |
|---|---|---|
| H01M 4/66 | (2006.01) | |
| H01M 10/0525 | (2010.01) | |
| C25D 3/38 | (2006.01) | |
| C25D 5/50 | (2006.01) | |
| H01M 4/13 | (2010.01) | |
| H01M 10/052 | (2010.01) | |
| H01M 4/02 | (2006.01) | |

(52) U.S. Cl.
CPC .............. *H01M 4/661* (2013.01); *C25D 3/38* (2013.01); *C25D 5/50* (2013.01); *H01M 4/13* (2013.01); *H01M 10/0525* (2013.01); *H01M 10/052* (2013.01); *H01M 2004/027* (2013.01); *H01M 2220/20* (2013.01); *Y02E 60/122* (2013.01)

(58) Field of Classification Search
CPC ............. H01M 4/661; H01M 10/0525; H01M 2220/20; C25D 5/50; C25D 3/38
See application file for complete search history.

(56) References Cited

U.S. PATENT DOCUMENTS

| | | | |
|---|---|---|---|
| 2005/0214562 A1* | 9/2005 | Muller-Hartmann | ........................ A61N 1/0408 428/615 |
| 2010/0104951 A1* | 4/2010 | Iwama | .................. H01M 4/133 429/337 |
| 2013/0045427 A1* | 2/2013 | Zhamu | .................... H01M 4/38 429/403 |
| 2015/0030873 A1* | 1/2015 | Cheng | ............... H01M 10/0562 428/606 |
| 2015/0340639 A1* | 11/2015 | Matsuura | ................. C25D 1/04 257/741 |

FOREIGN PATENT DOCUMENTS

| | | |
|---|---|---|
| JP | 2002-305034 A | 10/2002 |
| JP | 2010-103006 A | 5/2010 |
| KR | 10-2013-0130860 A | 12/2013 |

OTHER PUBLICATIONS

International Search Report dated Jun. 26, 2015, issued to the corresponding International Application No. PCT/KR2015/002726.

* cited by examiner

*Primary Examiner* — Muhammad S Siddiquee
(74) *Attorney, Agent, or Firm* — Stein IP, LLC

(57) ABSTRACT

Disclosed is an electrolytic copper foil obtained by heat treating a copper foil manufactured through electrolysis, the electrolytic copper foil having specific resistivity of 1.68 to 1.72 μΩ·cm and a grain mean diameter of a crystallite of 1.0 to 1.5 μm.

11 Claims, 1 Drawing Sheet

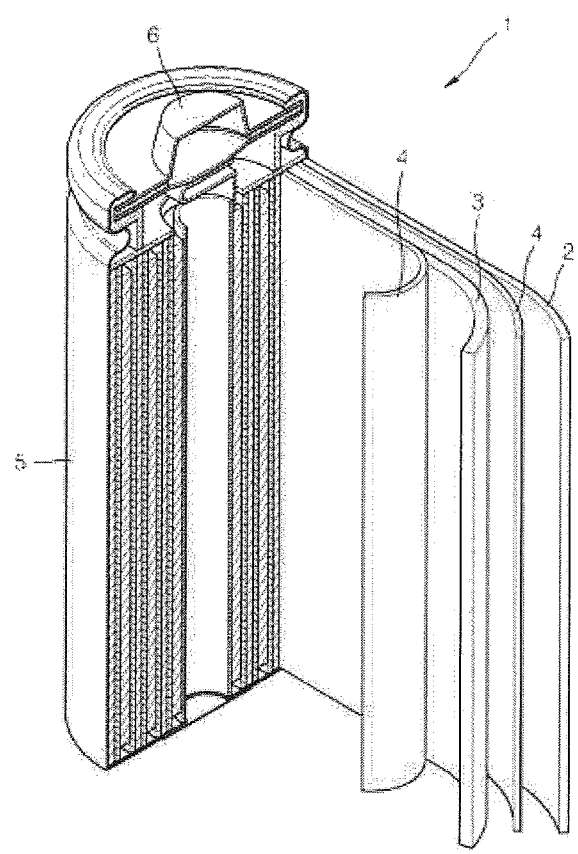

ELECTROLYTIC COPPER FOIL, AND COLLECTOR, NEGATIVE ELECTRODE, AND LITHIUM BATTERY COMPRISING SAME

CROSS-REFERENCE TO RELATED APPLICATIONS

This application is a national stage of International Application No. PCT/KR2015/002726, filed Mar. 20, 2015, which claims the benefit of priority to Korean Application No. 10-2014-0032933, filed Mar. 20, 2014, in the Korean Intellectual Property Office, the disclosures of which is incorporated herein by reference.

TECHNICAL FIELD

The present invention relates to an electrolytic copper foil, a current collector formed of the electrolytic copper foil, and a negative electrode and a lithium battery including the current collector.

BACKGROUND ART

A copper foil is generally used as a current collector of a medium and large lithium battery for a Hybrid Electric Vehicle (HEV). As the copper foil, a rolled copper foil by rolling processing is mainly used, but manufacturing cost of the rolled copper is high and it is difficult to fabricate a copper foil having a wide width.

Further, the rolled copper foil uses lubricating oil during the rolling processing, so that adhesion with an active material may be degraded by a contamination of the lubricating oil, so that a charging and discharging cycle characteristic of the battery may be degraded.

A lithium battery has a change in volume during charging and discharging and accompanies a heating phenomenon according to overcharging. Further, adhesion with an electrode active material needs to be improved. When a thickness of a current collector in the lithium battery is large, a capacity per volume of the lithium battery may be decreased. Accordingly, a highly elongated and highly strong copper foil, which is capable of resisting to a change in volume and a heating phenomenon of the lithium battery and has excellent adhesion with an active material, is required.

Accordingly, a copper foil having a small thickness, high mechanical strength, and a high elongation property is required.

DISCLOSURE

Technical Problem

The present invention has been made in an effort to provide a new electrolytic copper foil.

The present invention has also been made in an effort to provide a current collector formed of the electrolytic copper foil.

The present invention has also been made in an effort to provide a negative electrode including the current collector.

The present invention has also been made in an effort to provide a lithium battery including the negative electrode.

Technical Solution

According to an aspect of the present invention, there is provided an electrolytic copper foil obtained by heat treating a copper foil manufactured through electrolysis, the electrolytic copper foil having specific resistivity of 1.68 to 1.72 μΩ·cm and a grain mean diameter of a crystallite of 1.0 to 1.5 μm.

According to another aspect of the present invention, there is provided a current collector including the electrolytic copper foil.

According to another aspect of the present invention, there is provided a negative electrode, including: the current collector; and a negative electrode active material layer disposed on at least one surface of the current collector.

According to another aspect of the present invention, there is provided a lithium battery, including: the negative electrode; a positive electrode; and electrolyte disposed between the positive electrode and the negative electrode.

Advantageous Effect

According to one aspect of the present invention, the new heat-treated electrolytic copper foil has an increased grain mean diameter, so that it is possible to obtain the electrolytic copper foil which has uniform tensile strength, is highly elongated, and is thin.

DESCRIPTION OF DRAWINGS

FIG. 1 is a schematic diagram illustrating a lithium battery according to an exemplary embodiment.

| <Description of Reference Numerals and Signs> | |
|---|---|
| 1: Lithium battery | 2: Negative electrode |
| 3: Positive electrode | 4: Separator |
| 5: Battery case | 6: Cap assembly |

BEST MODE

Hereinafter, an electrolytic copper foil according to exemplary embodiments, a current collector formed of the electrolytic copper foil, and a negative electrode and a lithium battery including the current collector.

An electrolytic copper foil according to an exemplary embodiment is a copper foil obtained by heat treating a copper foil, which is manufactured through electrolysis, and has specific resistivity of 1.68 to 1.72 μΩ·cm and a grain mean diameter of a crystallite 1.0 to 1.5 μm.

The heat-treated electrolytic copper foil has relatively low specific resistivity (volume resistivity) and a relatively small grain mean diameter of the crystallite, so that the heat-treated electrolytic copper foil may provide uniform tensile strength and an increased elongation percentage. Particularly, the heat-treated electrolytic copper foil has an increased elongation percentage by the heat treatment, so that a lithium battery may more effectively accept a volume change during charging/discharging of an electrode active material layer.

When specific resistivity of the heat-treated electrolytic copper foil exceeds 1.72 μΩ·cm, an elongation percentage is decreased, or internal resistance of a lithium battery adopting the electrolytic copper foil as a current collector is increased, so that a high rate capability or a life characteristic may be degraded. When specific resistivity of the heat-treated electrolytic copper foil is less than 1.68 μΩ·cm, tensile strength may be degraded.

A grain mean diameter of the crystallite of the heat-treated electrolytic copper foil corresponds to a range of 1.0 to 1.5 μm, so that the heat-treated electrolytic copper foil may have an excellent elongation percentage. For example, a grain mean diameter of the crystallite of the heat-treated electrolytic copper foil may be 1.1 μm to 1.5 μm. For example, a grain mean diameter of the crystallite of the heat-treated electrolytic copper foil may be 1.2 μm to 1.5 μm. When a grain mean diameter of the crystallite of the heat-treated electrolytic copper foil is 1.0 μm or less, an elongation percentage of the heat-treated electrolytic copper foil may be decreased, and when a grain mean diameter of the heat-treated electrolytic copper foil exceeds 1.5 μm, the electrolytic copper foil becomes weak, so that a crack may be generated during the charging/discharging process of the lithium battery.

The heat-treated electrolytic copper foil has a single modal grain size distribution of the crystallite representing one peak in a grain size distribution diagram of the crystallite, and a Full Width at Half Maximum (FWHM) of the peak may be 0.8 to 1.5 μm.

Particularly, the heat-treated electrolytic copper foil has a single modal grain size distribution representing one peak in a grain size distribution diagram of the crystallite obtained from an Electron Backscattering Diffraction Pattern (EBSP) analysis, and an FWHM of the peak is 0.8 μm or more, so that the heat-treated electrolytic copper foil may have a uniform elongation percentage. When the FWHM of the peak of the electrolytic copper foil exceeds 1.5 μm or more, the tensile strength of the heat-treated electrolytic copper foil may be excessively degraded.

The tensile strength of the heat-treated electrolytic copper foil may be 20 kgf/mm$^2$ or more. For example, the tensile strength of the heat-treated electrolytic copper foil may be 25 kgf/mm$^2$ or more. For example, the tensile strength of the heat-treated electrolytic copper foil may be 30 kgf/mm$^2$ or more. The tensile strength is measured at a room temperature (25° C.). When the tensile strength of the heat-treated electrolytic copper foil is less than 20 kgf/mm$^2$, mechanical strength of the copper foil is excessively degraded, so that workability may be degraded.

Surface roughness Rz of a matte side of the heat-treated electrolytic copper foil may be 1.2 to 1.7 μm. For example, surface roughness Rz of the matte side of the electrolytic copper foil may be 1.3 to 1.7 μm. For example, surface roughness Rz of the matte side of the electrolytic copper foil may be 1.5 to 1.7 μm.

When the surface roughness Rz of the matte side is 1.2 μm or less, binding strength with a negative electrode active material layer in the negative electrode is decreased, and the current collector is electrically short-circuited with the negative electrode active material layer by a volume change of the negative electrode active material layer during the charging/discharging, so that a life characteristic of the lithium battery may be degraded.

When the surface roughness Rz of the matte side exceeds 1.7 μm, a thickness of the negative electrode active material layer becomes non-uniform and the lithium battery is not uniformly charged/discharged, so that a life characteristic of the lithium battery may be degraded.

Surface roughness Ra of a matte side of the heat-treated electrolytic copper foil may be 0.18 to 0.3 μm. For example, surface roughness Ra of the matte side of the electrolytic copper foil may be 0.18 to 0.28 μm. For example, surface roughness Ra of the matte side of the electrolytic copper foil may be 0.18 to 0.26 μm.

When the surface roughness Ra of the matte side is 0.18 μm or less, binding strength with the negative electrode active material layer in the negative electrode is decreased and thus the current collector is electrically short-circuited with the negative electrode active material layer by a volume change of the negative electrode active material layer during the charging/discharging, so that a life characteristic of the lithium battery may be degraded.

When the surface roughness Ra of the matte side exceeds 0.3 μm, a thickness of the negative electrode active material layer becomes non-uniform and thus the lithium battery is not uniformly charged/discharged, so that a life characteristic of the lithium battery may be degraded.

A shiny side of the heat-treated electrolytic copper foil may have the similar surface roughness to that of the matte side of the heat-treated electrolytic copper foil. When the surface roughness is considerably different between the shiny side and the matte side, thicknesses of the electrode active material layers disposed on both surfaces of the current collector become non-uniform, thereby degrading a life characteristic of the lithium battery.

In the heat-treated electrolytic copper foil, a difference between the surface roughness Rz of the matte side and the surface roughness Rz of the shiny side may be 0.5 μm or less. For example, in the electrolytic copper foil, a difference between the surface roughness Rz of the matte side and the surface roughness Rz of the shiny side may be 0.4 μm or less. For example, in the electrolytic copper foil, a difference between the surface roughness Rz of the matte side and the surface roughness Rz of the shiny side may be 0.3 μm or less.

An elongation percentage of the heat-treated electrolytic copper foil may be 14% or more. That is, the heat-treated electrolytic copper foil may have a high elongation percentage, which is 14% or more. For example, an elongation percentage of the heat-treated electrolytic copper foil measured at a room temperature after the heat treatment for one hour at 200° C. may be 14% or more. For example, an elongation percentage of the electrolytic copper foil may be 14% to 30%. For example, an elongation percentage of the electrolytic copper foil may be 15% to 30%. For example, an elongation percentage of the electrolytic copper foil may be 18% to 30%. The heat-treated electrolytic copper foil has a high elongation percentage of 14% or more, so that a lithium battery may effectively accept a volume change of an active material. When the elongation percentage of the heat-treated electrolytic copper foil is less than 14%, the current collector formed of the electrolytic copper foil may have a crack in the lithium battery, which is exposed to a high temperature and accompanies a volume change of the active material layer.

The heat treatment in the heat-treated electrolytic copper foil may be performed at a temperature of 150° C. or higher for 30 minutes or longer. For example, the heat treatment may be performed at a temperature of 180° C. or higher for 30 minutes or longer. For example, the heat treatment may be performed at a temperature of 190° C. or higher for 30 minutes or longer. For example, the heat treatment may be performed at a temperature of 200° C. or higher for 30 minutes or longer. For example, the heat treatment may be performed at a temperature of 200° C. for 1 hour. An elongation percentage of the electrolytic copper foil may be improved through the heat treatment.

In an X-Ray Diffraction (XRD) spectrum for the matte surface of the heat-treated electrolytic copper foil, a ratio I(220)/I(111) that is a ratio of strength (I(220)) of a diffraction peak for a (220) crystalline surface to strength (I(111)) of a diffraction peak for a (111) crystalline surface may be 0.7 to 1.5.

For example, the XRD spectrum for the extracted surface, a diffraction peak for the (111) crystalline surface is represented at a diffraction angle (2θ) 43.0°±1.0° and a diffraction peak for the (220) crystalline surface is represented at a diffraction angle (2θ) 74.1°±1.0°, and a strength ratio I(220)/I(111) thereof may be 0.7 to 1.4. For example, a strength ratio I(220)/I(111) in the electrolytic copper foil may be 0.7 to 1.3. Within the range of the strength ratio of the electrolytic copper foil, a life characteristic of the lithium battery adopting the electrolytic copper foil as the current collector may be improved.

In the XRD spectrum for the matte side of the heat-treated electrolytic copper foil, M(220)/M(111) that is a ratio of an orientation index (M(220)) for the (220) crystalline surface to an orientation index (M(111)) for the (111) crystalline surface is 3.5 to 8.0. The orientation index is a value obtained by dividing relative peak strength of a specific crystalline surface for a predetermined sample by relative peak strength of a specific crystalline surface obtained from a non-oriented standard sample for all of the crystalline surfaces. Within the range of the orientation index of the electrolytic copper foil, a life characteristic of the lithium battery adopting the electrolytic copper foil may be improved.

A thickness of the electrolytic copper foil may be 35 μm or less. For example, a thickness of the electrolytic copper foil may be 6 μm to 35 μm. For example, a thickness of the electrolytic copper foil may be 6 μm to 25 μm. For example, a thickness of the electrolytic copper foil may be 6 μm to 20 μm. For example, a thickness of the electrolytic copper foil may be 6 μm to 18 μm. For example, a thickness of the electrolytic copper foil may be 6 μm to 15 μm. For example, a thickness of the electrolytic copper foil may be 6 μm to 12 μm. A battery characteristic may be improved within the thickness of the electrolytic copper foil.

A surface treatment may be optionally and additionally performed on the electrolytic copper foil. The surface treatment on the electrolytic copper foil may include any one of a heat resistant and chemically resistant treatment, a chromate process, and a silane coupling treatment or a combination thereof.

The heat resistant and chemically resistant treatment may be performed by forming a thin film on a metal foil with any one of the metals, for example, nickel, tin, zinc, chrome, molybdenum, and cobalt, or an alloy thereof by using sputtering, electric plating, or electroless plating. In an aspect of cost, the electric plating is preferable. In order to easily extract metal ions, a complexing agent, such as citrate, tartrate, and sulfamate, may be added by a required quantity.

The chromate treatment uses an aqueous solution including hexavalent chrome ions. The chromate treatment may be performed by a simple immersion treatment, but is preferably performed by a negative electrode treatment. Further, the chromate treatment may be performed on an anticorrosion treatment, and thus, a wetproof property and heat resistance may be further improved.

As the silane coupling agent used for the silane coupling treatment, for example, epoxy functional silane, such as 3-glycioxypropyl trimethoxysilane, 2-(3,4-epoxy cyclohexyl)ethyltrimethoxysilane, amino functional silane, such as 3-aminoprophyl trimethoxysilane, N-2-(amimoethyl)-3-aminoprophyl trimethoxysilane, and N-2-(amimoethyl)-3-aminoprophylmethyl dimethoxy silane, olefin function silane, such as vinyltrimethoxy silane, vinylphenyltrimethoxysilane, and vinyltris(2-methoxyethoxy)silane, acryl functional silane, such as 3-acryloxypropyl trimethoxysilane, methacryl functional silane, such as 3-methacryloxyprophyl trimethoxysilane, and macapto functional silane, such as 3-macaptoprophyl trimethoxysilane, is used. The silane coupling agent may be solely used, or a combination of a plurality of silane coupling agents may also be mixed and used. The silane coupling agent is condensation-linked with a hydroxyl group of the metal for the anticorrosive treatment of the surface of the metal foil to form a film.

A current collector according to an exemplary embodiment is formed of the electrolytic copper foil. The current collector is formed of the aforementioned electrolytic copper foil, so that an electrical component may provide high electric conductivity and high strength, and easily accept a volume change of an electrode active material. For example, current collector may be a current collector for a lithium battery.

A negative electrode according to an exemplary embodiment includes: the aforementioned current collector; and a negative electrode active material layer disposed at least one surface of the current collector.

The negative electrode active material layer in the negative electrode may include a negative electrode active material, a binder, and a conductive material.

The negative electrode active material in the negative electrode may include one or more selected from the group consisting of a carbon-based material, a metal alloyable with lithium, a transition metal oxide, and a non-transition metal oxide.

For example, the negative electrode may be manufactured, for example, by the following method.

First, a negative electrode active material composition, in which a negative electrode active material, a conductive material, a binder, and a solvent are mixed, is prepared. The negative electrode active material composition is directly coated on a metal current collector, so that a negative electrode plate is manufactured. Differently, the negative electrode active material composition is casted on a separate support body, and then a film peeled from the support body is laminated on a metal current collector, so that a negative electrode plate is manufactured. The negative electrode is not limited to the enumerated forms, and may have other forms.

The negative electrode active material may be a noncarbon based material. For example, the negative electrode active material may include one or more selected from the group consisting of a metal alloyable with lithium, an alloy of a metal alloyable with lithium and other metals, an oxide of a metal alloyable with lithium, a transition metal oxide, and a non-transition metal oxide.

For example, the metal alloyable with lithium may include Si, Sn, Al, Ge, Pb, Bi, Sb, a Si—Y alloy (Y is alkali metal, alkali earth metal, group 13 to 16 elements, transition metal, a rare earth element, or a combined element thereof, and is not applied to Si), and a Sn—Y alloy (Y is alkali metal, alkali earth metal, group 13 to 16 elements, transition metal, a rare earth element, or a combined element thereof, and is not applied to Sn). The element Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may include a lithium titan oxide, a vanadium oxide, a lithium vanadium oxide, and the like.

For example, the non-transition metal oxide may be $SnO_2$ and $SiOx$ ($0<x<2$).

Particularly, the negative electrode active material may be one or more selected from the group consisting of Si, Sn, Pb, Ge, Al, SiOx ($0<x\leq2$), SnOy ($0<y\leq2$), $Li_4Ti_5O_{12}$, $TiO_2$, $LiTiO_3$, and $Li_2Ti_3O_7$, but is not essentially limited thereto, and any kind of carbon-based negative electrode active material used in the art may be used as the negative electrode active material.

Further, a complex of the noncarbon-based negative electrode active material and a carbon-based material may also be used, and the negative electrode active material may additionally include a carbon-based negative electrode active material, in addition to the noncarbon-based material.

The carbon-based material may be crystalline carbon, amorphous carbon, or a mixture thereof. The crystalline carbon may be graphite, such as non-shaped, plate-shaped, flake-shaped, globular-shaped, or fiber-shaped natural graphite or artificial graphite, and the amorphous carbon may be soft carbon (low temperature baked carbon) or hard carbon, a mesophase pitch carbide, baked coke, and the like.

As the conductive material, metal powder and metal fiber of acetylene black, ketjen black, natural graphite, artificial graphite, carbon black, carbon fiber, copper, nickel, aluminum, and silver may be used, and further, one kind or one or more kinds of conductive materials, such as polyphenylene derivatives, may be mixed and used, but the conductive material is not limited thereto, and any kind of conductive material usable in the art may be used as the conductive material. Further, the crystalline carbon-based material may be added as the conductive material.

As the binder, vinylidene fluoride/hexafluoropropylene copolymer, polyvinylidenefluoride (PVDF), polyacrylonitrile, polymethylmethaacrylate, polytetrafluoroethylene, and a mixture thereof, or styrene butadiene rubber-based polymer may be used, but the binder is not limited thereto, and any kind of material usable as a binder in the art may be used as the binder.

As the solvent, N-methyl pyrrolidone, acetone, or water may be used, but the solvent is not limited thereto, and any kind of material usable as a solvent in the art may be used as the solvent.

Contents of the negative electrode active material, the conductive material, the binder, and the solvent have levels generally used in a lithium battery. One or more of the conductive material, the binder, and the solvent may be omitted according to a usage and a configuration of the lithium battery.

A lithium battery according to an exemplary embodiment includes: the negative electrode; a positive electrode; and electrolyte disposed between the negative electrode and the positive electrode.

The lithium battery adopts the negative electrode including the current collector formed of the electrolytic copper foil, so that it is possible to provide an improved life characteristic and high-rate capability. Particularly, the lithium battery may provide an excellent life characteristic at a high temperature.

For example, the lithium battery may be manufactured, for example, by the following method.

First, a negative electrode is prepared as described above.

Next, a positive electrode active material composition, in which a positive electrode active material, a conductive material, a binder, and a solvent are mixed, is prepared. The positive electrode active material composition is directly coated on a metal current collector and dried, so that a positive electrode plate is manufactured. Differently, the positive electrode active material composition is casted on a separate support body, and then a film peeled from the support body is laminated on a metal current collector, so that a positive electrode plate is manufactured.

The positive electrode active material may include one or more selected from the group consisting of a lithium cobalt oxide, a lithium nickel cobalt manganese oxide, a lithium nickel cobalt aluminum oxide, a lithium iron phosphorus oxide, and a lithium manganese oxide, but the positive electrode active material is not essentially limited thereto, and all of the positive electrode active materials usable in the art may be used.

For example, $LiNiO_2$, $LiCoO_2$, $LiMnxO_2x(x=1, 2)$, $LiNi_{1-x}MnxO_2 (0<x<1)$, $LiNi_{1-x-y}Co_xMn_yO_2$ ($0\leq x\leq 0.5$, $0\leq y\leq 0.5$), $LiFeO_2$, $V_2O_5$, TiS, and MoS may be used.

The conductive material, the binder, and the solvent in the positive electrode active material may be the same as those in the negative electrode active material. In the meantime, pores may also be formed inside the electrode plate by further adding a plasticizer to the positive electrode active material and/or the negative electrode active material.

Next, a separator to be inserted between the positive electrode and the negative electrode is prepared.

A separator generally used in a lithium battery may be used as the separator. A separator, which is low resistant to a movement of ions of the electrolyte and has an excellent electrolyte absorbing capability, may be used. For example, the separator is selected from glass fiber, polyester, Teflon, polyethylene, polypropylene, polytetrafluoroethylene (PTFE), or a combination thereof, and may accept a nonwoven fabric form or a woven fabric form. For example, a separator, such as polyethylene and polypropylene, which may be wound, is used in a lithium ion battery, and a separator having an excellent organic electrolyte immersion capability may be used in a lithium ion polymer battery. For example, the separator may be manufactured, for example, by the following method.

A separator composition is prepared by mixing a polymer resin, a filler, and a solvent. The separator composition may be directly coated on an upper portion of an electrode and dried to form a separator. Otherwise, the separator composition may be casted on a support body and dried, and then a separator film peeled from the support body may be laminated on an upper portion of an electrode to form a separator.

The polymer resin used in manufacturing the separator is not particularly limited, and all of the materials used for a bonding material of an electrode plate may be used. For example, vinylidenefluoride/hexafluoropropylene copolymer, polyvinylidenefluoride (PVDF), polyacrylonitrile, polymethylmethaacrylate, or a combination thereof may be used.

Next, electrolyte is prepared.

For example, the electrolyte may be an organic electrolyte. Further, the electrolyte may be solid. For example, the electrolyte may be a boron oxide and a lithium oxynitride, but is not limited thereto, and any kind of materials usable as a solid electrolyte in the art may be used. The solid electrolyte may be formed on the negative electrode by sputtering, and the like.

For example, an organic electrolyte may be prepared. The organic electrolyte may be prepared by dissolving lithium salt in an organic solvent.

Any kind of materials usable as an organic solvent in the art may be used as the organic solvent. For example, the organic solvent may be propylene carbonate, ethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethylformamide, dimethylacetamide, dimethylsulfoxide, dioxane, 1,2-dimethoxyethane, sulforane, dichloroethane, chlorobenzene, nitrobenzene, diethylene glycol, dimethyl ether, or any combinations thereof.

Any kind of materials usable as lithium salt in the art may be used as the lithium salt. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (x and y are natural numbers), LiCl, LiI, or a mixture thereof.

As illustrated in FIG. 1, the lithium battery 1 includes a positive electrode 3, a negative electrode 2, and a separator 4. The positive electrode 3, the negative electrode 2, and the separator 4 are wound or folded and accommodated in a battery case 5. Next, an organic electrolyte is injected into the battery case 5 and the battery case 5 is sealed with a cap assembly 6 to complete the lithium battery 1. The battery case may have a cylindrical shape, a polygonal shape, and a thin film shape. For example, the lithium battery may be a thin film battery. The lithium battery may be a lithium ion battery.

A separator is disposed between the positive electrode and the negative electrode, so that a battery structure may be formed. The battery structures are laminated in a bicell structure, and then are immersed in the organic electrolyte, and when the obtained result is accommodated in a pouch and sealed, a lithium ion polymer battery is completed.

Further, the plurality of battery structures is laminated to form a battery pack, and the battery pack may be used for every device requiring high capacity and high output. For example, the battery structure may be used in a notebook computer, a smart phone, and an electric vehicle.

Particularly, the lithium battery has an excellent high-rate capability and life characteristic so that the lithium battery is suitable to an Electric Vehicle (EV). For example, the lithium battery is suitable to a hybrid vehicle, such as a Plug-in Hybrid Electric Vehicle (PHEV).

A temperature of copper electrolyte used in manufacturing the electrolytic copper foil may be 30 to 60° C., but is not essentially limited to the range, and may be properly adjusted within a range, in which the object of the present invention may be achieved. For example, a temperature of the copper electrolyte may be 40° C. to 50° C.

A current density used in the manufacturing method may be 20 to 90 $A/dm^2$, but is not essentially limited to the range, and may be properly adjusted within a range, in which the object of the present invention may be achieved. For example, the current density may be 40 to 70 $A/dm^2$.

The copper electrolyte may be a sulfuric acid-copper sulfate copper electrolyte. In the sulfuric acid-copper sulfate copper electrolyte, a concentration of copper sulfate pentahydrate may be 200 g/L to 400 g/L, a concentration of sulfuric acid may be 50 g/L to 140 g/L, a concentration of an addition agent 1 (Iron(II) sulfate heptahydrate) may be 0.001 g/L to 0.5 g/L, and a concentration of an addition agent 2 (Nickel(II) sulfate hexahydrate) may be 0.005 g/L to 0.2 g/L.

The electrolyte copper foil may be manufactured by a publicly known method except for the use of the copper electrolyte.

For example, the electrodeposited copper foil may be fabricated by supplying the copper electrolyte between a negative electrode surface and a positive electrode surface on a curved surface of titanium of a rotating titanium drum and electrolyzing the copper electrolyte, extracting the electrodeposited copper foil on the negative electrode surface, and continuously winding the extracted electrodeposited copper.

MODE FOR CARRYING OUT THE INVENTION

Hereinafter, the present invention will be described in more detail with reference to examples, but the present invention is not limited thereto.

Manufacture Electrolyte Copper Foil

Examples 1 to 4 and Comparative Examples 1 to 3

In order to manufacture an electrolytic copper foil by electrolysis, a Dimensionally Stable Electrode (DSE) plate having a size of 10×10 $cm^2$ was used as a positive electrode, and a titanium electrode plate having the same size as that of the positive electrode was used as a negative electrode.

For the smooth movement of $Cu^{2+}$ ions, plating was performed with a current density of 40 to 70 $A/dm^2$, and the electrolytic copper foil having a thickness of 12 μm was manufactured. A temperature of a plating bath was 50° C.

A basic composition of the copper electrolyte is as follows.

$CuSO_4 \cdot 5H_2O$: 200~400 g/L $H_2SO_4$: 50~140 g/L

An addition agent 1 and an addition agent 2 were added to the copper electrolyte, and a composition of the added addition agent 1 and addition agent 2 is represented in Table 1 below. In Table 1 below, ppm means the same concentration as mg/L. The manufactured electrolytic copper foil was heat treated in a micro-oven at 200° C. for 1 hour.

TABLE 1

|  | $CuSO_4 \cdot 5H_2O$ [g/L] | $H_2SO_4$ [g/L] | Addition agent 1 [ppm] | Addition agent 2 [ppm] | Current density [$A/dm^2$] |
| --- | --- | --- | --- | --- | --- |
| Example 1 | 350 | 125 | 10 | 5 | 60 |
| Example 2 | 350 | 125 | 50 | 10 | 70 |
| Example 3 | 280 | 80 | 20 | 5 | 50 |
| Example 4 | 310 | 110 | 10 | 10 | 50 |
| Comparative Example 1 | 280 | 80 |  |  | 50 |
| Comparative Example 2 | 320 | 140 |  |  | 50 |
| Comparative Example 3 | 300 | 120 |  |  | 50 |

In Table 1, the addition agent 1 is iron(II) sulfate heptahydrate, and the addition agent 2 is nickel(II) sulfate hexahydrate. According to the use of the addition agent, a property of the electrolytic copper foil may be improved.

Manufacture Negative Electrode and Lithium Battery

Example 5

Negative electrode active material slurry was fabricated by mixing artificial graphite and a polyvinylidene fluoride (PVDF) binder in an N-methyl pyrrolidone solvent so that a weight ratio of the active material and the binder is 94:6.

A negative electrode was manufactured by coating the negative electrode active material slurry on a matte side of the heat-treated electrolytic copper foil manufactured in Example 1 by a thickness of 60 μm, drying the negative electrode active material slurry in a hot air dryer at 100° C. for 0.5 hour, drying the negative electrode active material slurry again in a vacuum state at 120° C. for 4 hours, and then roll pressing the negative electrode active material slurry.

When a lithium battery was manufactured, metal lithium was used as a counter electrode, and a polyethylene isolating layer having a thickness of 20 μm was used as an isolating layer, and 1.15M $LiPF_6$ dissolved in a mixed solvent of EC(ethyl carbonate):EMC(ethyl methyl carbonate):DEC(diethyl carbonate) (3:3:4 volume ratio) was used as electrolyte.

Examples 6 to 8 and Comparative Examples 4 to 6

A negative electrode and a lithium battery were manufactured by the same method of as that of Example 6, except that the electrolytic copper foils of Examples 2 to 4, and Comparative Examples 1 to 3 were used instead of the electrolytic copper foil of Example 1.

Evaluative Example 1: Measure Electron Backscattering Diffraction Pattern (EBSP), Specific Resistivity, and Concentration EBSPs of the heat-treated electrolytic copper foils obtained in Examples 1 to 4, and Comparative Examples 1 to 3 were measured, crystallite grain mean diameters and full widths at half maximum of crystallite grain size distribution peaks in crystallite grain size distribution diagrams were calculated from the measured EBSP, and specific resistivity of matte sides was measured by a four-point probe method, and a result of the measurement is represented in Table 2 below. In the crystallite grain size distribution diagrams obtained from the electrolytic copper foils of Examples 1 to 4, a crystallite size (x-axis) and an area fraction (y-axis) occupied by the crystallite are illustrated, and a single modal grain size distribution representing one peak is represented.

TABLE 2

|  | Grain mean diameter (μm) | FWHM of Grain grain size distribution peak (μM) | Specific resistivity [μΩ · cm] |
|---|---|---|---|
| Example 1 | 1.36 | 0.98 | 1.69 |
| Example 2 | 1.34 | 0.86 | 1.72 |
| Example 3 | 1.16 | 1.04 | 1.72 |
| Example 4 | 1.04 | 0.89 | 1.68 |
| Comparative Example 1 | 1.54 | 0.78 | 1.74 |
| Comparative Example 2 | 1.57 | 0.79 | 1.76 |
| Comparative Example 3 | 1.59 | 0.75 | 1.75 |

As represented in Table 2, in the electrolytic copper foils of Examples 1 to 4, specific resistivity was 1.68 to 1.72 μΩ·cm, grain mean diameters of the crystallites were 1.0 to 1.5 μm, and full widths at half maximum of the crystallite grain size distribution peak is 0.8 to 1.5 μm, but the electrolytic copper foils of Comparative Examples went beyond the ranges.

Evaluative Example 2: XRD Experiment

XRD spectrums of the matte sides of the heat-treated electrolytic copper foils obtained in Examples 1 to 4, and Comparative Examples 1 to 3 were measured.

I(220)/I(111) that is a ratio of strength (I(220)) of a diffraction peak for the (220) crystalline surface to strength (I(111)) of a diffraction peak for the (111) crystalline surface in the spectrum is calculated and represented in Table 3 below.

Further, orientation indexes M for (111), (200), (220), (311), and (222) crystalline surfaces in the XRD spectrums for the matte sides of the heat-treated electrolytic copper foils of Examples 1 to 4, and Comparative Examples 1 to 3 were measured. The orientation index was measured by using the orientation index M suggested by SElectrochim. Acta 39, 589(1994).

For example, in a sample having the (111) surface, the orientation index M is calculated by a method below.

$$IFR(111)=IF(111)/\{IF(111)+IF(200)+IF(220)+IF(311)\}$$

$$IR(111)=I(111)/\{I(111)+I(200)+I(220)+I(311)\}$$

$$M(111)=IR(111)/IFR(111)$$

IF(111) is XRD strength in a JCPDS cards, and I(111) is an experiment value. When M(111) is larger than 1, M(111) has preferred orientation parallel to the (111) surface, and when M(111) is smaller than 1, it means that preferred orientation is decreased.

M(220)/M(111) that is a ratio of an orientation index (M(220)) for the (220) crystalline surface to an orientation index (M(111)) for the (111) crystalline surface in XRD spectrums for the matte sides of the electrolytic copper foils of Examples 1 to 4, and Comparative Examples 1 to 3 is measured and represented in Table 3 below.

Evaluative Example 3: Measure Tensile Strength and Elongation Percentage

A maximum load of the tensile strength measured by extracting tension specimens having a width of 12.7 mm× and a gauge length of 50 mm from the heat-treated electrolytic copper foils obtained in Examples 1 to 4 and Comparative Examples 1 to 3, and then performing a tension test at a crosshead speed of 50.8 mm/min under the standard IPC-TM-650 2.4.18B was referred to as room-temperature tensile strength, and an elongation percentage at the fracture was referred to as a room-temperature elongation percentage. A measurement temperature of the tensile strength after the high-temperature heat treatment and the elongation percentage after the high-temperature heat treatment is 25° C.

The tensile strength after the high-temperature heat treatment and the elongation percentage after the high-temperature heat treatment obtained by the measurement method are represented in Table 3 below.

TABLE 3

|  | Tensile strength after high-temperature heat treatment [kgf/mm$^2$] | Elongation percentage after high-temperature heat treatment [%] | I(220)/ I(111) | M(220)/ M(111) |
|---|---|---|---|---|
| Example 1 | 27 | 14.02 | 1.03 | 5.14 |
| Example 2 | 27.2 | 14.0 | 0.68 | 3.40 |
| Example 3 | 27.6 | 18.1 | 1.23 | 6.15 |

TABLE 3-continued

|  | Tensile strength after high-temperature heat treatment [kgf/mm$^2$] | Elongation percentage after high-temperature heat treatment [%] | I(220)/ I(111) | M(220)/ M(111) |
| --- | --- | --- | --- | --- |
| Example 4 | 26.8 | 18.6 | 1.69 | 8.48 |
| Comparative Example 1 | 25.2 | 12.7 | 2.2 | 8.77 |
| Comparative Example 2 | 25.4 | 12.9 | 2.14 | 8.67 |
| Comparative Example 3 | 26.5 | 13.4 | 2.23 | 9.66 |

As represented in Table 3, in the electrolytic copper foils of Examples 1 to 4, tensile strength after the high-temperature heat treatment was 20 kgf/mm$^2$ or more, and elongation percentages after the high-temperature heat treatment were 14% or more, but the electrolytic copper foils of Comparative Examples went beyond the ranges.

Further, I(220)/I(111) of the heat-treated electrolytic copper foils of Examples 1 to 4 was 0.7 to 1.5, and M(220)/M(111) of the heat-treated electrolytic copper foils of Examples 1 to 4 was 3.5 to 8.0, but the electrolytic copper foils of Comparative Examples went beyond the ranges.

That is, the electrolytic copper foils after the heat treatment of Examples 1 to 4 had improved tensile strength and increased elongation percentages.

When tensile strength of the electrolytic copper foil is less than 20 kgf/mm$^2$ after the high-temperature heat treatment, mechanical strength is low, so that it may be difficult to treat the electrolytic copper foil, and when an elongation percentage of the electrolytic copper foil is less than 14% after the high-temperature heat treatment, a crack may be generated by a volume change of an active material layer during the charging/discharging of the lithium battery.

Evaluative Example 4: Evaluation of High Temperature Charging/Discharging Characteristics The lithium cells manufactured in Examples 5 to 8 and Comparative Examples 4 to 6 were constant current charged with a current of 0.2 C rate at 25° C. until a voltage reaches 0.01 V (vs. Li) and were constant voltage charged until the current reaches 0.01 C while maintaining 0.01V. Next, the lithium cells were discharged with a constant current of 0.2 C until the voltage reaches 1.5 V (vs. Li) during the discharging.

Subsequently, the lithium cells were constant current charged with a current of 0.5 C rate until the voltage reaches 0.01 V (vs. Li) and were constant voltage charged until the current reaches 0.01 C while maintaining 0.01V. Next, the lithium cells were discharged with a constant current of 0.5 C until the voltage reaches 1.5 V (vs. Li) during the discharging (chemical conversion step).

The lithium cells passing through the chemical conversion step were constant current charged with a current of 1.0 C rate at a high temperature of 45° C. until the voltage reaches 0.01 V (vs. Li) and were constant voltage charged until the current reaches 0.01 C while maintaining 0.01V. Next, a cycle of discharging the lithium cells with a constant current of 1.0 C until the voltage reaches 1.5 V (vs. Li) during the discharging was repeated 100 times.

A high temperature capacity maintaining rate is expressed by Equation 1 below.

$$\text{High temperature capacity maintaining rate [\%]} = [\text{Discharge capacity at } 100^{th} \text{ cycle/Discharge capacity at } 1^{st} \text{ cycle}] \times 100 \qquad <\text{Equation 1}>$$

As a result of the experiment, the lithium cells of Examples 5 to 8 exhibit an improved high temperature life characteristic (capacity maintaining rate) compared to the lithium cells of Comparative Examples 4 to 6. Particularly, the life characteristics of the lithium cells of Examples 7 and 8 were further improved that those of the lithium cells of Examples 5 and 6.

It is determined that because the heat-treated electrolytic copper foil has improved tensile strength and an increased elongation percentage, and thus the electrolytic copper foil effectively accepts a volume change of the electrode at a high temperature and a crack of the current collector is suppressed, the lithium cells of Examples 5 to 8 have the improved life characteristics.

Evaluative Example 5: Experiment of High-Rate Charging/Discharging

The lithium cells manufactured in Examples 5 to 8 and Comparative Examples 4 to 6 were constant current charged with a current of 0.5 C rate at a room temperature of 25° C. until a voltage reaches 0.01 V (vs. Li) and were constant voltage charged until the current reaches 0.01 C while maintaining 0.01V. Next, the lithium cells were discharged with a constant current while sequentially increasing a current density until the voltage reaches 1.5 V (vs. Li) during the discharging. The current densities during the discharging were 0.05 C, 0.1 C, 0.2 C, 0.5 C, 1 C, 2 C, and 5 C rates, respectively.

The high-rate capability is expressed by Equation 2 below.

$$\text{High-rate capability [\%]} = [\text{Discharge capacity at } 7^{th} \text{ cycle (in a case where the lithium cell is discharged with 5 C)/Discharge capacity at } 1^{st} \text{ cycle (in a case where the lithium cell is discharged with 0.05 C)}] \times 100 \qquad <\text{Equation 2}>$$

As a result of the experiment, the lithium cells of Examples 5 to 8 exhibit an improved high rate capability because the capacity decrease is suppressed at a high rate of 5 C rate, compared to the lithium cells of Comparative Examples 4 to 6. Particularly, the life characteristics of the lithium cells of Examples 7 and 8 were further improved that those of the lithium cells of Examples 5 and 6.

It is determined that because the heat-treated electrolytic copper foil has improved tensile strength and an increased elongation percentage, and thus adhesion between the active material layer and the current collector is improved and interfacial resistance between active material layer and the current collector is decreased, the lithium cells of Examples 5 to 8 have the improved life characteristics.

INDUSTRIAL APPLICABILITY

One aspect of the present invention provides a new electrolytic copper foil.

Another aspect of the present invention provides a current collector fainted of the electrolytic copper foil.

Another aspect of the present invention provides a negative electrode including the current collector.

Another aspect of the present invention provides a lithium battery including the negative electrode.

The invention claimed is:

1. An electrolytic copper foil obtained by heat treating a copper foil manufactured through electrolysis, the electrolytic copper foil having specific resistivity of 1.68 to 1.72 µΩ·cm and a grain mean diameter of a crystallite of 1.0 to 1.5 µm,
   wherein the electrolytic copper foil has a single modal grain size distribution representing one peak in a grain size distribution diagram obtained from an Electron Backscattering Diffraction Pattern (EBSP) analysis of the crystallite, and a Full Width at Half Maximum (FWHM) of the peak is 0.8 to 1.5 µm,
   wherein in an XRD spectrum for a matte side of the electrolytic copper foil, M(220)/M(111) that is a ratio of an orientation index (M(220)) for a (220) crystalline surface to an orientation index (M(111)) for a (111) crystalline surface is 3.5 to 8.0.

2. The electrolytic copper foil of claim 1, wherein tensile strength of the electrolytic copper foil is 20 kgf/mm$^2$ or more.

3. The electrolytic copper foil of claim 1, wherein an elongation percentage of the electrolytic copper foil is 14% or more.

4. The electrolytic copper foil of claim 1, wherein the heat treatment is performed at 200° C. for one hour.

5. The electrolytic copper foil of claim 1, wherein in an X-Ray Diffraction (XRD) spectrum for a matte surface of the electrolyte copper foil, I(220)/I(111) that is a ratio of strength (I(220)) of a diffraction peak for a (220) crystalline surface to strength (I(111)) of a diffraction peak for a (111) crystalline surface is 0.7 to 1.5.

6. The electrolytic copper foil of claim 1, wherein a thickness of the electrolytic copper foil is 6 to 35 µm.

7. A current collector comprising the electrolytic copper foil of claim 1.

8. A negative electrode, comprising:
   the current collector of claim 7; and
   a negative electrode active material layer disposed on at least one surface of the current collector.

9. The negative electrode of claim 8, wherein
   the negative electrode active material layer includes a negative electrode active material, a binder, and a conductive material.

10. The negative electrode of claim 8, wherein the negative electrode active material includes one or more selected from the group consisting of a carbon-based material, a metal alloyable with lithium, a transition metal oxide, and a non-transition metal oxide.

11. A lithium battery, comprising:
    the negative electrode of claim 8;
    a positive electrode; and
    electrolyte disposed between the positive electrode and the negative electrode.

* * * * *